(No Model.)
E. R. IVES.
MECHANICAL TOY.
No. 260,987. Patented July 11, 1882.
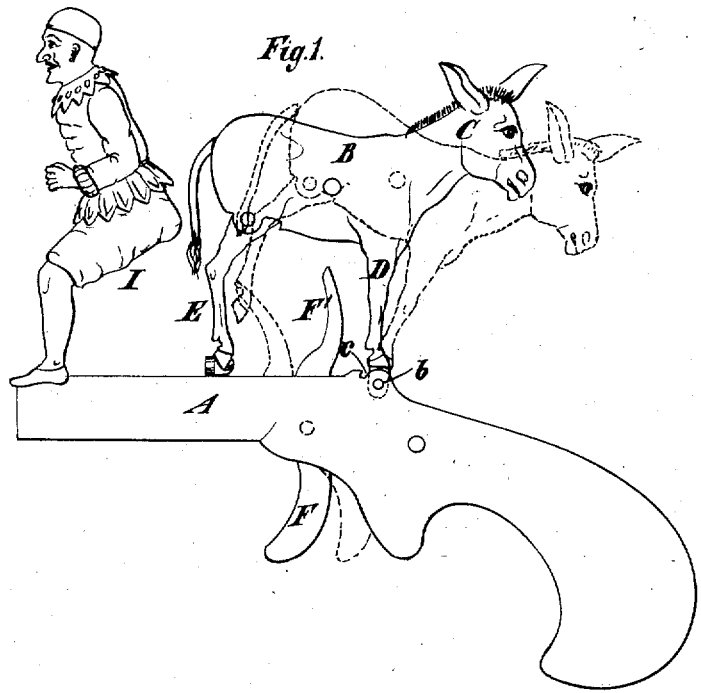
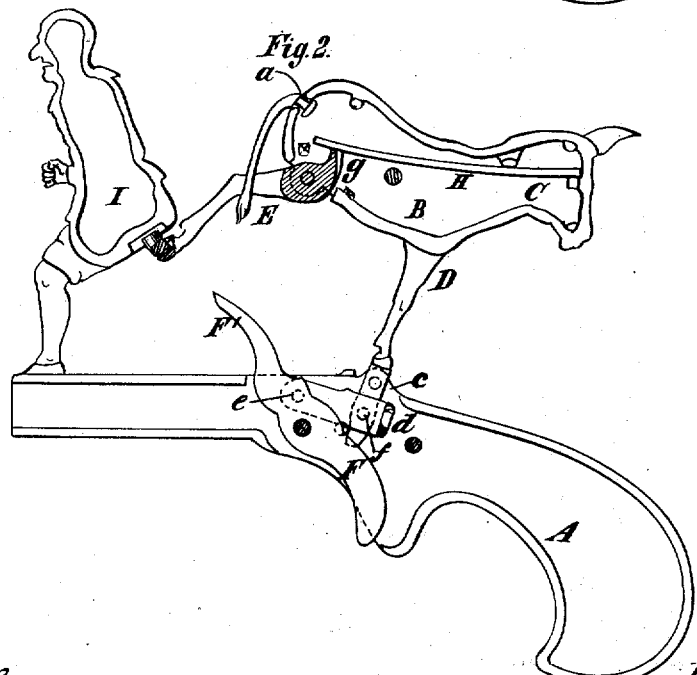
Witnesses
Chandler Hall
J. J. Keane
Inventor
Edward R. Ives
by his atty.
Edwin H. Brown

UNITED STATES PATENT OFFICE.

EDWARD R. IVES, OF BRIDGEPORT, CONNECTICUT, ASSIGNOR TO IVES, BLAKESLEE & CO., OF SAME PLACE AND NEW YORK, N. Y.

MECHANICAL TOY.

SPECIFICATION forming part of Letters Patent No. 260,987, dated July 11, 1882.

Application filed January 30, 1882. (No model.)

*To all whom it may concern:*

Be it known that I, EDWARD R. IVES, of Bridgeport, in the county of Fairfield and State of Connecticut, have invented a certain new and useful Improvement in Mechanical Toys, of which the following is a specification.

My improvement principally consists in certain combinations of parts comprised in a kicking animal, but it also consists in the combination, with a kicking animal, of means for operating it, and a receptacle for a cap or fulminate arranged in such position that the kicking leg or legs can reach it.

In the accompanying drawings, Figure 1 is a side view of a toy embodying my improvement, the kicking animal being shown in two positions; and Fig. 2 is a longitudinal section of the same.

Similar letters of reference designate corresponding parts in both figures.

A designates the base of the toy. It is shown as made in the form of a pistol, and it may be made of two longitudinal castings united by a rivet or rivets. On it is mounted a kicking animal. The animal shown in this example of my improvement is a donkey or a mule. The body B, head portion C, and fore legs, D, are rigidly connected and may be cast together in two longitudinal parts, each including one side of the body and head and one of the fore legs. The hind legs, E, as here shown, are rigidly connected together by casting or otherwise, and are pivoted to the body portion B. The tail has a groove, $a$, near the upper end, and the adjacent portion of the body B engages with this groove, and the tail has thus a swiveling connection with the body.

The animal is connected to the base A only by the fore legs, and these legs are secured by pivots $b$ in a recess, $c$, in the said base. Where the animal is made of two longitudinal parts, as suggested, the pivots $b$ may be cast on the fore legs and inserted in their bearings before the said parts are riveted or otherwise secured together. The animal is thus rendered susceptible of a rocking movement relatively to the base A. Such rocking movement may be imparted to it by a coiled or other spring fastened to the base A and acting on the fore legs of the animal; but I prefer to provide for this purpose other means, which I will now describe.

F designates a lever, which occupies the place of and resembles an ordinary trigger. It is pivoted to the base A, and may, when the said base is made of two longitudinal castings, have integral pivots. In such case the pivots will be inserted in their bearings before the two parts of the base are fastened together. This lever, above its pivots, is connected by a link, G, with an extension from one of the fore legs of the animal. As here shown, the link has in it holes which fit on teats or projections cast, one, $e$, on the side of the lever F and the other, $f$, on the reverse or adjacent side of the extension of the fore leg, before referred to. A lateral projection, $d$, on the link bears against one of the sides of the base A, and thus prevents the link from slipping off the teats or projections $e\,f$. By pulling back the lower end of the lever F the animal is caused to rock on the fore legs, and then throw its hind legs into the air, and by releasing this lever the animal is allowed to descend by gravity. In this way the animal may be rocked to simulate the movements of an animal preparatory to kicking.

The hind legs, as here shown, have pivots cast on them, and these are fitted into recesses in the two longitudinal parts forming the body and head of the animal before such parts are fastened together. If the body portion were not made of two longitudinal parts, the pivots would have to be made separate. These legs are provided above the pivots with a projection, $g$, against which bears a spring, H. When the legs are down the spring bears at such angle on the projection $g$ as to tend to hold them down; but when the legs are moved slightly backward the spring is caused to bear on the tip of the said projection at such angle as to forcibly impel these legs backward as far as they can move.

On the upper end of the lever F is a horn-like extension, F', and after the lower end of the lever has been manipulated to rock the animal, as before described, it can be pulled farther back to start the hind legs sufficiently far back to allow the spring H to act on them and impel them backward to the fullest extent.

I designates a cap or fulminate receptacle, made in the form of a man in a stooping posture. The caps or fulminate are held in such position that the hind legs of the animal will strike them when impelled backward by the spring H.

It will be observed that I thus produce a very simple and amusing toy, and that the same means which serve to rock the animal also serve to actuate the hind legs.

When the animal is caused to rock by a spring acting on the fore legs a stationary horn, like the horn F', but affixed to the base A, may be employed to start the hind legs in their backward movement. A catch for controlling the actuating-spring will in this modification of my invention be necessary.

What I claim as my invention, and desire to secure by Letters Patent, is—

1. The combination, in a toy, of a base, an animal pivoted thereto by the fore legs, which are rigidly connected with the body and have an extension below the pivot, a lever, and a connection between said lever and extension for acting on the fore legs to rock the animal, substantially as specified.

2. The combination, in a toy, with a base and an animal mounted thereon so as to be adapted to have a rocking movement imparted to its body upon the fore legs, and having hind legs pivoted to its body, of a horn or similar device extending from the base and acting on the hind legs after the body is impelled upward on the fore legs as a pivot, substantially as specified.

3. The combination, in a toy, with a base and an animal mounted thereon so as to be adapted to have a rocking movement imparted to its body, and having hind legs pivoted to its body, and provided with an extension beyond the pivot, of a horn or similar device extending from the base for imparting an initial backward movement to the hind legs, and a spring having a bearing upon the extension of the hind legs for completing the backward movement of the said hind legs, substantially as specified.

4. The combination, in a toy, with a base and an animal pivoted thereto by fore legs which are rigidly connected with the body and are provided with an extension beyond the pivot, of the lever F and the link G, connecting said lever with the extension, substantially as specified.

5. The combination, in a toy, with a base and an animal pivoted thereto by fore legs which are rigidly connected with the body and are provided with an extension beyond the pivot, and having its hind legs pivoted to the body, of the lever F, horn F', and the link G, connecting said lever with the said extension, substantially as specified.

6. The combination, in a toy, with a base and an animal pivoted thereto by the fore legs, which are rigidly connected with the body and are provided with an extension beyond the pivot, and having its hind legs pivoted to the body, and provided with the projection $g$, of the lever F, horn F', the link G, connecting said lever with said extension, and the spring H, bearing on the projection $g$, substantially as specified.

7. The combination, in a toy, with a base, of a rocking animal and a cap-receptacle adapted to be reached by the hind legs of the animal when the animal is rocked, substantially as specified.

EDWARD R. IVES.

Witnesses:
C. F. RITCHEL,
J. C. CHAMBERLAIN.